Nov. 17, 1970   M. D. JONES ET AL   3,541,368
SENSOR CONSTRUCTION
Filed Aug. 16, 1968
2 Sheets—Sheet 1
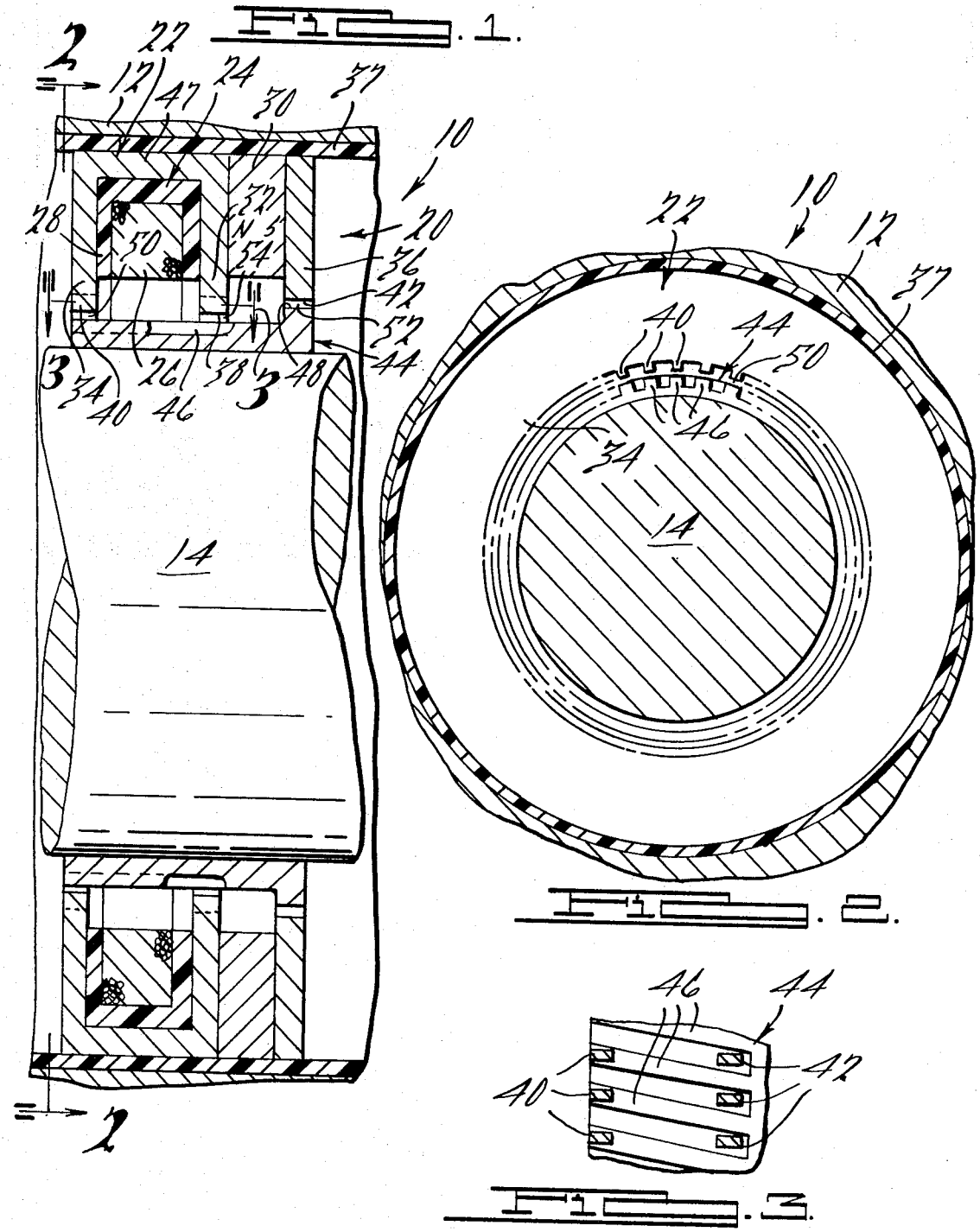
INVENTORS
Malcolm D. Jones,
BY Thomas M. Atkins
Harness, Dickey & Pierce
ATTORNEYS

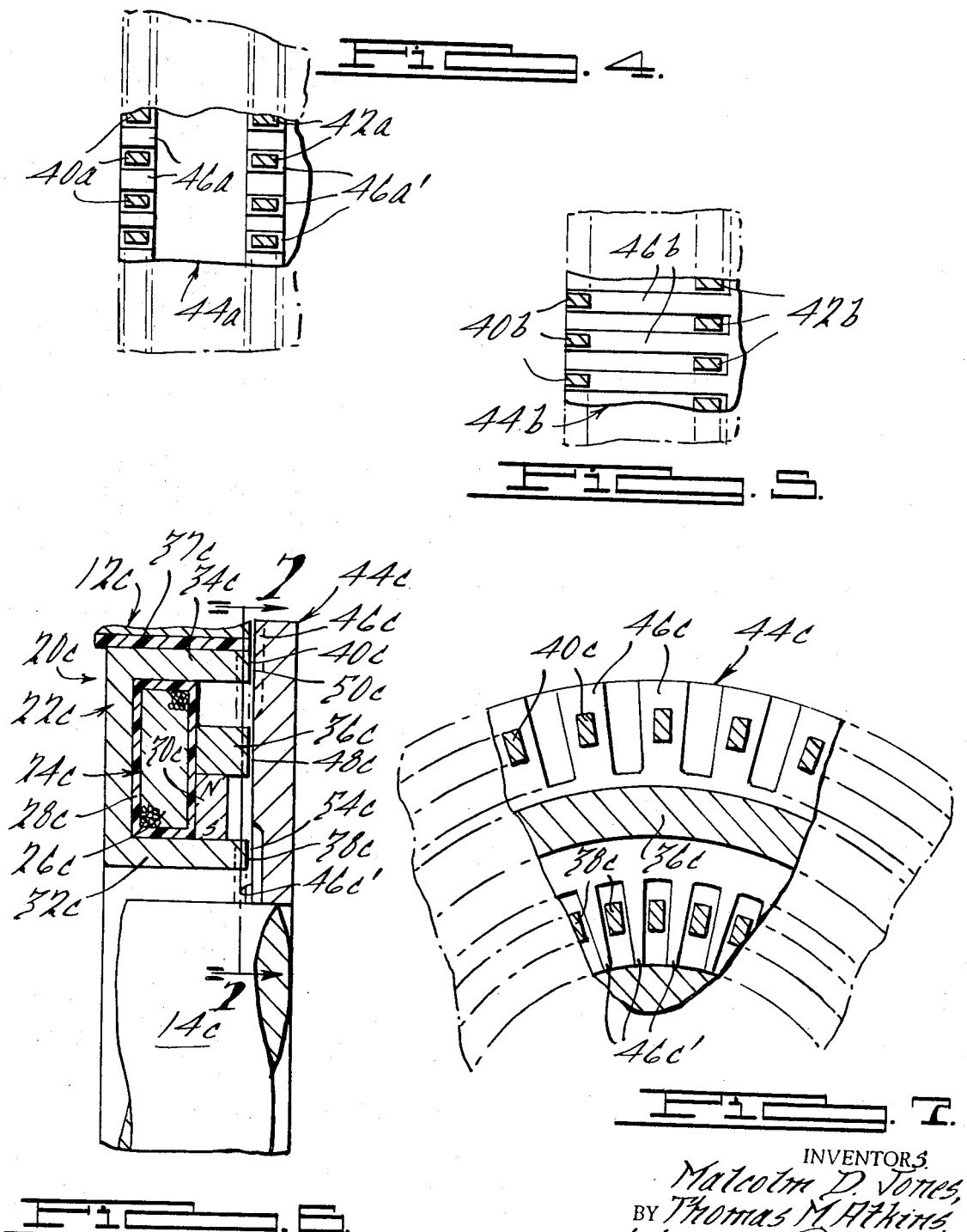

United States Patent Office 3,541,368
Patented Nov. 17, 1970

3,541,368
SENSOR CONSTRUCTION
Malcolm D. Jones, Belleville, and Thomas M. Atkins, Ann Arbor, Mich., assignors to Kelsey-Hayes Company, Romulus, Mich., a corporation of Delaware
Filed Aug. 16, 1968, Ser. No. 753,194
Int. Cl. H02k 19/20
U.S. Cl. 310—168
16 Claims

ABSTRACT OF THE DISCLOSURE

An electrical sensor for sensing rotational speed between a pair of relatively rotatable members with the sensor including a pair of relatively rotatable poles and a sensing coil and including an arrangement for alternately switching flux from a path in the magnetic circuit of the coil to a path shunting the coil so that the change in flux in the magnetic circuit of the coil is maximized resulting in output signal having a large amplitude.

SUMMARY BACKGROUND OF THE INVENTION

The present invention relates to electrical speed sensors.

In sensing rotational speed, specifically for use in a skid control system for a vehicle, it is desirable to have a sensor which provides an output signal of high amplitude. In general, the greater the change in the flux in the magnetic circuit of a coil the greater the amplitude of the output signal from that coil. Therefore, to provide such a signal it is desirable that the flux through the magnetic circuit of the sensing coil vary from a maximum to a minimum. In the present invention a rotor and stator having confronting toothed portions are utilized such that alternate low and high reluctance paths result in the magnetic circuit of the coil. In addition, however, in order to minimize the flux in the coil magnetic circuit during a high reluctance condition a second magnetic path shunting the coil is provided. Thus at the time at which the coil magnetic circuit has a high reluctance the shunt circuit provides a low reluctance path to minimize the flux acting on the coil and at the time when the coil magnetic circuit has a low reluctance the shunt circuit has a high reluctance to maximize the flux acting on the coil. With such a construction the difference in flux acting on the coil from the one condition to the other will be maximized resulting in a signal having a high amplitude.

It is proposed that a permanent magnet be used and by virtue of the switching between circuits, as noted above, the magnetic circuit for the magnet will appear to have a substantially constant reluctance. As a result of having a magnetic path of nearly constant reluctance it is believed that the magnet will be more efficient in its operation.

Therefore, it is an object of the present invention to provide an improved rotational speed sensing device.

It is another object of the present invention to provide a rotational speed sensor of the above described type in which the magnetic circuit for the magnet appears to the magnet to have a substantially constant reluctance.

It is another object of the present invention to provide a rotational speed sensor of the above described type in which the change in flux through the magnetic circuit for the sensing coil is maximized by a magnetic shunt path.

Other objects, features, and advantages of the present invention will become apparent from the subsequent description and the appended claims, taken in conjunction with the accompanying drawings, in which:

FIG. 1 is a sectional view with some parts shown broken away of a sensor assembly embodying features of the present invention;

FIG. 2 is a view to reduced scale of the sensor assembly of FIG. 1, taken generally along the lines 2—2;

FIG. 3 is a sectional view of the sensor assembly taken generally along the lines 3—3;

FIGS. 4 and 5 are views similar to FIG. 3 of modified forms of the sensor assembly of FIG. 1;

FIG. 6 is a sectional view, similar to FIG. 1, of a different form of the sensor assembly; and FIG. 7 is a sectional view of a sensor assembly of FIG. 6 taken generally along the lines 7—7.

Looking now to FIGS. 1–3 of the drawings, the sensor assembly is generally indicated by the numeral 10 and is shown in assembly relationship with a fixed member 12 and a rotatable member 14 and includes a stator assembly 20 which includes an annularly extending stator member 22 having a U-shaped cross section and in which is mounted an annularly extending coil assembly 24 which includes a coil member 26 supported in a plastic bobbin 28. An annularly extending permanent magnet 30 is located adjacent the inner, shunt leg 32 of the stator member 22. The stator member 22 has a second, outer leg 34. A return member 36 is generally washer shaped and is located adjacent the magnet 30. An annular housing member 37, of non-magnetic material holds the stator assembly 20, including stator 22, coil assembly 24, magnet 30 and return member 36 together and is adapted to be mounted to fixed member 12.

The radially inner ends of the legs 32 and 34 are provided with pluralities of circumferentially distributed axially extending teeth 38 and 40, respectively. The radially inner end 42 of the return member 36 is provided to be generally smooth.

A rotor 44 is located generally coaxially with the stator assembly 20 and is supported for rotation on rotatable member 14; the rotor 44 extends annularly and is provided with a plurality of circumferentially distributed, axially extending teeth 46 which extend axially sufficiently to confront teeth 38 and 40 of legs 32 and 34, respectively. The rotor 44 also has a generally smooth portion 48 which is in axial alignment with and in radial confrontation with the smooth surface 42 of the return member 36. The teeth 46 are axially skewed (see FIG. 3) while the teeth 38 and 40 are in axial alignment. Thus when portions of teeth 46 are in direct confrontation with teeth 40, the teeth 38 will be in confrontation with the gaps between teeth 46 and vice versa. The magnetic circuit acting on coil 26 from magnet 30 includes the outer portion 47 of stator 22 connecting legs 32 and 34, the outer leg 34, the gap 50 between teeth 40 on the leg 34 and teeth 46 on rotor 44, the rotor 44, the gap 52 between rotor 44 and the return member 36. Thus when portions of teeth 46 are in alignment with the teeth 40 a low reluctance path (air gap 50 short) will be provided for the magnetic circuit acting on coil 26 from the magnet 30 and when the teeth 40 and 46 are out of alignment (air gap 50 long) for the magnetic circuit acting on coil 26 a high reluctance path will be provided. In order to further minimize the flux through the magnetic circuit for coil 26 when in the high reluctance condition a shunt circuit is provided. The magnetic shunt circuit from magnet 30 includes shunt leg 32 of stator 22, air gap 54 between teeth 38 on leg 32 and teeth 46 on rotor 44, the rotor 44, the gap 52 between rotor 44 and return member 36. Thus when portions of teeth 46 are in alignment with teeth 38 the shunt circuit will have a low reluctance (air gap 54 short) and when teeth 46 are out of alignment with teeth 38 the shunt circuit will have a high reluctance (air gap 54 long). The teeth 46 are skewed, as noted, such that when the coil magnetic circuit has a low reluctance the shunt circuit has a high reluctance and vice versa. The result is that in the high reluctance condition for the magnetic circuit for the coil 26 the shunt path, having a low reluctance, will substantially further diminish the flux acting on the coil 26 to a minimum; however, in the low reluctance condition for magnetic circuit of coil 26 the high reluctance shunt circuit will have little effect on the flux acting on coil 26. The large variation in the magnitude of the flux acting on the coil 26 (from the low reluctance to the high reluctance condition of the coil magnetic circuit) results in a signal from coil 26 of a high amplitude. At the same time the total magnetic circuit of the magnet 30 will appear to be of substantially constant magnitude which, it is believed, will improve the efficiency of the magnet 30.

FIG. 4 shows a variation of the construction of the stator; in the embodiment of FIG. 4 components similar to like components in the construction of FIGS. 1–3 have been given the same numerical designation with the addition of the letter *a*. Thus in FIG. 4 rather than having teeth 46 which are skewed, pairs of teeth 46*a* and 46*a'* which are circumferentially offset are utilized to provide the switching effect between the circuit for the coil and the shunt circuit.

FIG. 5 is still a different embodiment in which like components have been given the same numerical designation with the addition of the letter *b*. Here the teeth 46*b* are axially straight while the teeth 40*b* and 42*b* are offset circumferentially to provide for the switching action.

A modified form of the invention is shown in FIG. 6 in which components similar to like components in the construction of FIGS. 1–3 are given the same numerical designation with the addition of a letter *c*. A stator assembly 20*c* includes an annularly extending stator member 22*c* having a generally U-shaped cross section; stator 22*c* has a radially outer leg 34*c* and a radially inner shunt leg 32*c*. The legs 32*c* and 34*c* terminate at their axially inner ends with circumferentially disposed, radially extending teeth 38*c* and 40*c*, respectively. A coil assembly 24*c* extends annularly and is supported in the stator 22*c* and includes an annularly extending coil 26*c* supported in a plastic U-shaped bobbin 28*c*. An annularly extending ring magnet 30*c* is located adjacent the shunt leg 32*c* and has a polarity as indicated in the drawing. An annular return ring 36*c* is located adjacent the magnet 30*c* on its radially outer side. The stator assembly 20*c* is supported in a non-magnetic member 37*c* which in turn is supported on a fixed member 12*c*. A rotor 44*c* of a flat washer shape is adapted to be supported for rotation on a rotatable member 14*c* and has at its radially outer end a plurality of circumferentially distributed, radially extending teeth 46*c* which are in confrontation with teeth 40*c* on leg 34*c* of the rotor member 22*c* and has at its radially inner end a second plurality of circumferentially distributed, radially extending teeth 46*c'* which are in confrontation with the teeth 38*c* of the shunt leg 32*c*. The teeth 40*c* and 38*c* are in radial and circumferential alignment while the teeth 46*c* and 46*c'* are out of radial and circumferential alignment. Similarly to the embodiment of FIGS. 1–3, the gap 50*c* between teeth 40*c* and 46*c* is in the magnetic circuit for coil 26*c* while gap 54*c* between teeth 38*c* and 46*c'* is in the shunt circuit. The gap 48*c* between return ring 36*c* and rotor 44*c* is in the return path for both circuits. Thus when the teeth 40*c* and 46*c* are in alignment, the teeth 38*c* and 46*c'* will be out of alignment thereby providing for the magnetic circuit for coil 26*c* to have a low reluctance (gap 50*c* short) and the shunt circuit to have a high reluctance (gap 54*c* long). In the next position, when the teeth 46*c* and 40*c* are out of alignment, the teeth 46*c'* and 38*c* are in alignment whereby the magnetic circuit for coil 26*c* will have a high reluctance (gap 50*c* long) and the shunt circuit will have a low reluctance (gap 54*c* short); the combination of the shunt path being in a low reluctance condition at the same time that the coil path is in a high reluctance condition will minimize the amount of flux acting on the coil 26*c* at that time; this will maximize the change of flux to coil 26*c* as the condition of its magnetic circuit varies from low to high reluctance thereby resulting in an output signal of high amplitude. Again the magnet 30*c* will have a magnetic circuit in which the total reluctance as seen by the magnet 30*c* will appear substantially constant. Note that the same result could be obtained by making the teeth 46*c* and 46*c'* circumferentially aligned and circumferentially offsetting teeth 38*c* and 40*c*.

While it will be apparent that the preferred embodiments of the invention disclosed are well calculated to fulfill the objects above stated, it will be appreciated that the invention is suscepible to modification, variation and change without departing from the proper scope or fair meaning of the subjoined claims.

What is claimed is:

1. An electrical sensor for sensing the rotational speed between a pair of relatively rotatable members, the sensor comprising: a rotor, a stator, a sensing coil, magnet means for providing a magnetic field, magnetic circuit means for transmitting said magnetic field and comprising a first magnetic path means operatively connected with said sensing coil for transmitting said magnetic field to said sensing coil and a second magnetic path means for shunting said magnetic field away from said sensing coil, and switching means operatively connected with said rotor and said stator for alternately transmitting said magnetic field to said first and said second magnetic path, said magnetic circuit means having a first condition with said first magnetic path means having a high reluctance and said second magnetic path means having a low reluctance and a second condition with said first magnetic path means having a low reluctance and said second magnetic path means having a high reluctance, said switching means alternately switching said magnetic circuit means between said first and second conditions, said switching means comprising one plurality of teeth on said stator located juxtaposed with a different plurality of teeth located on said rotor, some of said one plurality and different plurality of teeth being in said second magnetic path means and being movable into and out of confrontation with each other as said rotor rotates, with said magnetic circuit means in said first condition said some of said teeth being out of confrontation and said others of said teeth being in confrontation, and with said magnetic circuit means in said second condition said some of said teeth being in confrontation and said others of said teeth being out of confrontation, one of said one and different pluralities of teeth being skewed relative to the direction of rotation of said rotor.

2. The apparatus of claim 1 with the other of said one and different pluralities of teeth being generally transverse relative to the direction of rotation of said rotor.

3. An electrical sensor for sensing the rotational speed between a pair of relatively rotatable members, the sensor comprising: a rotor, a stator, a single sensing coil, magnet means for providing a magnetic field, magnetic circuit means for transmitting said magnetic field and comprising a first magnetic path means operatively connected with said sensing coil for transmitting said magnetic field to said sensing coil and a second magnetic path means for shunting said magnetic field away from said sensing coil, and switching means operatively connected with said rotor and said stator for alternately transmitting said magnetic field to said first and said second magnetic paths, said magnetic circuit means having a first condition with said first magnetic path means having a high reluctance and said second magnetic path means having a low reluctance and a second condition with said first magnetic path means having a low reluctance and said second magnetic path means having a high reluctance, said switching means alternately switching said magnetic circuit means between said first and second conditions, said switching means comprising a first plurality of circumferentially disposed teeth on said rotor juxtaposed with a second plurality of circumferentially disposed teeth on said stator, said first and second plurality of teeth extending generally axially relative to the axis of rotation of said rotor, said stator having a pair of legs, said sensing coil supported between said pair of legs, said first magnetic path means including only one of said legs, said second magnetic path means including only the other of said legs, including a permanent magnet having one side located adjacent said other of said legs and having a return path member located adjacent the opposite side of said magnet.

4. An electrical sensor for sensing the rotational speed between a pair of relatively rotatable members, the sensor comprising: a rotor, a stator, a single sensing coil, magnet means for providing a magnetic field, magnetic circuit means for transmitting said magnetic field and comprising a first magnetic path means operatively connected with said sensing coil for transmitting said magnetic field to said sensing coil and a second magnetic path means for shunting said magnetic field away from said sensing coil, and switching means operatively connected with said rotor and said stator for alternately transmitting said magnetic field to said first and said second magnetic paths, said magnetic circuit means having a first condition with said first magnetic path means having a high reluctance and said second magnetic path means having a low reluctance and a second condition with said first magnetic path means having a low reluctance and said second magnetic path means having a high reluctance, said switching means alternately switching said magnetic circuit means between said first and second conditions, said switching means comprising a first plurality of circumferentially disposed teeth on said rotor juxtaposed with a second plurality of circumferentially disposed teeth on said stator, said first and second pluralities of teeth extending generally radially relative to the axis of rotation of said rotor, said stator having a pair of legs, said sensing coil supported between said pair of legs, said first magnetic path means including only one of said legs, said second magnetic path means including only the other of said legs.

5. The apparatus of claim 4 with some of said first and second pluralities of teeth being in confrontation when the others of said first and second pluralities of teeth are out of confrontation.

6. The apparatus of claim 4 with some of said second plurality of teeth being on one of said legs and the other of said second plurality of teeth being on the other of said legs.

7. The apparatus of claim 4 including a permanent magnet having one side located adjacent said other of said legs and having a return path member located adjacent the opposite side of said magnet.

8. An electrical sensor for sensing the rotational speed between a pair of relatively rotatable members, the sensor comprising: a rotor, a stator, a single sensing coil, magnet means for providing a magnetic field, magnetic circuit means for transmitting said magnetic field and comprising a first magnetic path means operatively connected with said sensing coil for transmitting said magnetic field to said sensing coil and a second magnetic path means for shunting said magnetic field away from said sensing coil, and switching means operatively connected with said rotor and said stator for alternately transmitting said magnetic field to said first and said second magnetic paths, said magnetic circuit means having a first condition with said first magnetic path means having a high reluctance and said second magnetic path means having a low reluctance and a second condition with said first magnetic path means having a low reluctance and said second magnetic path means having a high reluctance, said switching means alternately switching said magnetic circuit means between said first and second conditions, one of said stator and said rotor having a pair of legs, said sensing coil supported between said pair of legs, said first magnetic path means including only one of said legs, said second magnetic path means including only the other of said legs, including a permanent magnet having one side located adjacent said other of said legs and having a return path member located adjacent the opposite side of said magnet.

9. An electrical sensor for sensing the rotational speed between a pair of relatively rotatable members, the sensor comprising: rotor means for rotating with the rotatable one of said members, a stator, a sensing coil, magnet means for providing a magnetic field, magnetic circuit means for transmitting said magnetic field and comprising a first magnetic path means operatively connected with said sensing coil for transmitting said magnetic field to said sensing coil and a second magnetic path means for shunting said magnetic field away from said sensing coil, and switching means operatively connected with said rotor means and stator for alternately transmitting said magnetic field to said first and said second magnetic paths, said switching means comprising teeth on said rotor means and said stator, said stator including a pair of axially spaced circumferentially extending legs radially extending from opposite sides of said coil, said magnet means comprising a permanent magnet member located adjacent one of said legs, a third circumferentially extending leg member located adjacent to and on the opposite side of said magnet member and extending radially from said magnet member, said rotor means comprising a unitary member in at least one of said magnetic path means which is in confrontation with at least two legs as defined by said pair of legs and said third leg member.

10. The sensor of claim 9 with said unitary member being in both said magnetic path means and in confrontation with both said pair of legs and with said third leg member.

11. The sensor of claim 10 with said unitary member having a single row of teeth in confrontation with teeth on at least two legs as defined by said pair of legs and said third leg member.

12. The sensor of claim 11 with said two legs being said pair of legs, and with said rotor means, said stator, said coil and said third leg member being substantially annular.

13. An electrical sensor for sensing the rotational speed between a pair of relatively rotatable members, the sensor comprising: rotor means for rotating with the rotatable one of said members, a stator, a sensing coil, magnet means for providing a magnetic field, magnetic circuit means for transmitting said magnetic field and comprising a first magnetic path means operatively connected with said sensing coil for transmitting said magnetic field to said sensing coil and a second magnetic path means for shunting said magnetic field away from said sensing coil, and switching means operatively connected with said rotor means and stator for alternately transmitting said magnetic field to said first and said second magnetic paths, said switching means comprising teeth on said rotor means and said stator, said stator including a pair of radially spaced circumferentially extending legs axially extending from opposite sides of said coil, said magnet means comprising a permanent magnet member located adjacent one of said legs, a third circumferentially extending leg member located adjacent to and on the opposite side of said magnet member and extending axially from said magnet member, said rotor means comprising a unitary member in at least one of said magnetic path means which is in confrontation with at least two legs as defined by said pair of legs and said third leg member.

14. The sensor of claim 13 with said unitary member being in both said magnetic path means and in confrontation with both of said pair of legs and with said third leg member.

15. The sensor of claim 14 with said unitary member having two rows of teeth in confrontation with teeth on two legs as defined by said pair of legs and said third leg member.

16. The sensor of claim 15 with said two legs being said pair of legs and with said rotor means, said stator, said coil and said third leg member being substantially annular.

References Cited
UNITED STATES PATENTS

| | | | |
|---|---|---|---|
| 563,427 | 7/1896 | Steinmetz | 310—190 |
| 1,998,409 | 4/1935 | Klaiber | 310—155 |
| 2,648,021 | 8/1953 | Kaczor | 310—168 |
| 2,769,953 | 11/1956 | Schwain | 310—168 |
| 3,253,170 | 5/1966 | Phillips | 310—168 |
| 3,267,399 | 8/1966 | Spieker | 310—168 |
| 3,452,229 | 6/1969 | Pimlott | 310—168 |

MILTON O. HIRSHFIELD, Primary Examiner

R. SKUDY, Assistant Examiner

U.S. Cl. X.R.

310—181